United States Patent
Faita

[11] Patent Number: 5,929,770
[45] Date of Patent: Jul. 27, 1999

[54] ELECTRONIC DEVICE FOR THE REMOTE DISPLAYING OF INFORMATION

[75] Inventor: Marco Faita, Trezzano Sul Naviglio, Italy

[73] Assignee: TECDIS S.p.A., Aosta, Italy

[21] Appl. No.: 08/687,546

[22] PCT Filed: Jan. 24, 1995

[86] PCT No.: PCT/IT95/00006

§ 371 Date: Aug. 8, 1996

§ 102(e) Date: Aug. 8, 1996

[87] PCT Pub. No.: WO95/25300

PCT Pub. Date: Sep. 21, 1995

[30] Foreign Application Priority Data

Mar. 15, 1994 [IT] Italy .................................. MI94A0479

[51] Int. Cl.⁶ .................................................. H04Q 7/20
[52] U.S. Cl. ...................... 340/825.35; 705/28; 705/400; 705/22; 359/154; 177/25.15; 235/385
[58] Field of Search ..................... 340/825.35, 825.54, 340/825.07, 825.15; 705/28, 400, 22, 23, 416, 414; 359/154; 177/25.15; 235/383, 375, 385

[56] References Cited

U.S. PATENT DOCUMENTS

| | | | |
|---|---|---|---|
| 4,656,463 | 4/1987 | Anders et al. | 340/825.54 X |
| 4,904,993 | 2/1990 | Sato . | |
| 4,937,586 | 6/1990 | Stevens et al. | 340/825.35 X |
| 4,961,533 | 10/1990 | Teller et al. | 705/28 X |
| 4,962,466 | 10/1990 | Revesz et al. | 340/825.35 X |
| 5,442,343 | 8/1995 | Cato et al. | 340/825.35 |
| 5,467,474 | 11/1995 | Ackerman et al. | 340/825.35 X |
| 5,532,465 | 7/1996 | Waterhouse et al. | 235/383 |
| 5,539,393 | 7/1996 | Barfod | 340/825.35 X |
| 5,704,049 | 12/1997 | Briechle | 340/825.35 X |
| 5,736,967 | 4/1998 | Kayser et al. | 340/825.35 X |
| 5,774,876 | 6/1998 | Wolley et al. | 705/28 |
| 5,812,985 | 9/1998 | Failing et al. | 705/400 X |

FOREIGN PATENT DOCUMENTS

| | | |
|---|---|---|
| 0 396 414 | 11/1990 | European Pat. Off. . |
| 0514244 A1 | 11/1992 | European Pat. Off. . |
| 2231994 | 11/1990 | United Kingdom . |
| WO 91/05227 | 4/1991 | WIPO . |
| WO92/16901 | 10/1992 | WIPO . |

*Primary Examiner*—Brian Zimmerman
*Assistant Examiner*—William H. Wilson, Jr.
*Attorney, Agent, or Firm*—Panitch Schwarze Jacobs & Nadel, P.C.

[57] ABSTRACT

An electronic device for remotely displaying information includes a central control unit in connection with a plurality of electronic labels (4) through a communication network made up of a plurality of nodes (1) connected to said central unit, each node (1) being provided with an infrared transmitter (2) for sending signals to the labels (4) and with a radio frequency receiver (6) to receive messages coming from the labels (4), while each label (4) is provided with an infrared receiver (3) to receive messages coming from the nodes (1) and with a radio frequency transmitter (5) to send messages to the nodes (1).

11 Claims, 2 Drawing Sheets

ELECTRONIC DEVICE FOR THE REMOTE DISPLAYING OF INFORMATION

BACKGROUND OF THE INVENTION

The present invention relates to an electronic device for remotely displaying information on a plurality of displays, in particular a device employing the infrared (IR) transmission between the central control unit and the remote displaying units whereas the radio frequency (RF) transmission is employed in the opposite direction.

A typical application of said kind of device is in supermarkets and the like, where the variation of the prices of the exhibited products involves a long manual work for replacing the corresponding labels positioned on the shelves. Various remote displaying systems have been proposed to avoid this waste of labour, essentially consisting of a plurality of displays (typically LCD) located on the shelves as a replacement for the conventional labels and updated by means of IR, RF, ultrasonic, etc. signals emitted by a plurality of transmitters connected to a central control unit. In this way, it is sufficient to introduce the new list of prices in the central unit so that it can transmit them to the corresponding electronic "labels" in an automatic way, without any need of further human intervention. For the sake of simplicity, reference will be made hereafter to this kind of application, though it is clear that what will be said can be transferred to other similar applications.

The transmitters are usually connected by wire to the central unit, preferably using the electric cables already present for the lighting, and they make up a network of communication "nodes" each of which controls a group of labels. Furthermore, each label has an own specific "address" within a single group, so that it is possible to act separately on each single label. To this purpose, the data transmission begins with a code which identifies the label or the group of labels to which the message is directed.

For a greater system reliability it is absolutely preferable that the success of the data transmission to the labels is acknowledged by means of a reply message emitted by the latter towards their node. In order to do so, each label as well as each node must be provided with a transceiving apparatus. This allows to overcome the limits of one-way systems, such as for example those disclosed in U.S. Pat. No. 4,766, 295 and in the international (PCT) patent applications WO 88/06773 and WO 90/13067. In particular, while in the first two above-cited cases the transmission takes place in IR or RF, therefore with the theoretical possibility of providing the labels with a reply transmitter, in the third case the transmission is carried out by modulating the artificial light, so that the lack of reception of a signal within a pre-established time is indicated only by the flashing of the display. It is apparent that such a solution still implies a check by the operator, and therefore can not be accepted for a system intended to reduce to the utmost the need for labour.

Examples of remote displaying devices with two-way transmission are disclosed in GB patent 2.231.994 and in the international (PCT) patent applications WO 90/14630, WO 92/08213 and WO 92/16901. The kind of transmission preferably used is the IR one, since it is immune from electromagnetic interferences, but also the RF transmission is possible as disclosed in U.S. Pat. No. 4,937,586. However, in this case the transmission from the nodes to the labels takes place by means of horizontal loop antennae which must effectively surround the whole area of the supermarket, with the cabling and positioning problems deriving therefrom. Even if other types of antennae are used for said transmission, these problems are not completely solved, particularly because the labels may be located in "shadow regions" in which the reception of the RF signal from the node may be very difficult. On the other hand, the transmission power can not be excessively increased because interferences out of the building could be generated. Moreover, the frequencies available for these transmissions are generally comprised in the band from 10 to 500 KHz, as indicated in the above-cited U.S. Pat. No. 4,937,586. In particular, from the node to the labels it is advantageous to employ a carrier of about 450 KHz to reduce the disturbances by the environmental "noise", while in the opposite direction lower frequencies (about 150 KHz) are employed to reduce the consumption of the RF transmitter of the label. In this way, since the reply message is very short and simple it does not suffer from disturbances and does not require a lot of energy, also because the node is in an exposed and easily reachable position. However, there is the drawback that the RF receiver of the label has a relatively high consumption, since it must operate at frequencies higher than 400 KHz.

Also IR transceiving apparatuses, however, are not exempt from problems, especially due to the lower energetic efficiency of said type of transmission with respect to the RF one. In particular, the problem of high consumption is a serious drawback for the reply transmission from the labels to the nodes, whereas the latter do not have consumption problems because they are fed through the electric lighting. It should also be considered that the reflection of IR signals by the objects is lower than that of RF signals, so that the nodes must be provided with a plurality of IR transmitters oriented in all directions to be sure to reach all labels (e.g. see WO 92/16901). Clearly, the same propagation problem is present, though to a lesser extent, in the transmission from label to node, thus involving the need, in order to reduce said problem, to orient the label properly and/or to provide it with more differently oriented IR transmitters, with a considerable energy increase.

Since the nodes are located on the ceiling or a little lower while the labels may be positioned even at a few centimeters above the floor, it results that the distance to be covered by the reply transmission may reach even 10 meters or more, depending on the number of labels controlled by each node. As an indication, it may be considered that while a LED consumes 1-5-2 A for an IR transmission over such a distance, an RF transmitter requires not more than 10 mA and with a few tens of mA it can reach about a hundred meters.

These energy requirements decisively affect the performances of the labels, which are usually operated by a battery (as in WO 90/14630) possibly recharged by solar cells (as in GB 2.231.994 and WO 92/16901). It is clear that the solution of the battery alone not only poses greater limits on the consumption, but also periodically implies an expensive and long operation for replacing the exhausted batteries on the great number of labels which make part of the system, and which can be several thousands for supermarkets of a certain size (e.g. 20.000). Even rechargeable batteries, though they have a longer life, progressively deteriorate for the repeated charging and discharging cycles, finally requiring a replacement. Moreover, the battery is not able to emit a peak current like the one required by the IR LED, as explained above, so that it is also necessary to have a capacitor which accumulates the energy to be discharged at the moment of the transmission, which moreover can not be repeated until the capacitor has not been sufficiently recharged. Therefore it is apparent that the presence of the battery and capacitor make each label quite expensive and cumbersome.

The only solution proposed in the above-cited documents to attenuate the consumption problems of the label transmitting in IR is the increase in the number of nodes of the communication network so as to reduce the transmission distances. In the case of the system disclosed in the above-mentioned application WO 90/14630, there is considered that each node controls 50 to 75 labels, so that the network is made up of nodes spaced 60–120 centimeters one from the other. This leads to a very high number of nodes, for example at least 300 nodes to control about 20.000 labels, with the huge costs involved in the manufacturing and installation of such a network. The great number of nodes also makes the control and maintenance of the system more expensive, and affects its overall reliability.

A further drawback of the prior art two-way systems stems from the use of the same kind of transmission, either in IR or RF, for the communications from the nodes to the labels and for those in the opposite direction. Since the kind of transmission is the same, a signal emitted from a node and reflected by the underlying objects may be picked up by the receiver of the same node which could try to interpret it as a label reply, or it could interfere with the reply signals transmitted by the labels. This problem is enhanced by the fact that the transceiving units used in the nodes and in the labels are preferably the same, for saving purposes. For example, the device disclosed in the above-cited application WO 92/16901 includes, both in the nodes and in the labels, IR transmission LEDs operating at wavelenghts from 840 to 980 nm and receiving photodiodes which have the greatest sensitivity at the same wavelengths. It is apparent that this can cause interferences between the transmissions in the two directions and the environmental reflections of said transmissions.

A possible solution to this drawback is proposed in the above-cited patent GB 2.231.994. It consists in switching off the receiver for a pre-established period of time after the transmission of the signal, so that possible reflected signal are not misinterpreted by the receiver. However, this arrangement implies the evaluation of the time required for a signal to be reflected towards the source, said time being variable depending on the objects present along the direction of emission of the signal. Therefore it is clear that it is not possible to calibrate the system as a whole, rather it is necessary to calibrate each single transceiving apparatus according to its particular environmental operating conditions. Obviously, this is a very unpractical procedure in the case of systems other than small-sized ones, which moreover has to be repeated when the environment in which the transmissions travel is modified, for example by moving some shelves, etc. Furthermore, it may happen that the reply signal of a label near the node is emitted within a time shorter than that required for the reflection of a transmission signal by an object far from the node, so that the node receiver could be unable to receive the label reply because it is still switched off.

SUMMARY OF THE INVENTION

Therefore, a first object of the present invention is to provide a remote displaying device capable to overcome all the above-cited drawbacks.

Another object is to provide a device with which the supermarket customers can interact, so as to collect information on the customers' behaviour.

Still a further object is to provide a device which also eliminates the need for a periodical check of the amounts of goods present on the shelves.

These objects are achieved by means of a device having the characteristics cited in the attached claims.

The first and most considerable advantage of the device according to the present invention is that it achieves high performances with a very low cost, since the single elements forming it have been simplified to the utmost. The elimination of the battery and capacitor from the label significantly reduce cost and bulkiness thereof. Furthermore, the feed by the solar cell alone and the use of solid state components make any maintenance unnecessary.

The RF transmission from the labels to the nodes allows a dramatic reduction of the number of nodes making up the communication network, since each of them can be positioned at a great distance from the labels and can control a very large number thereof (theoretically upto 65536). All the possible interference problems due to reflection of the signals by the objects are solved at the root by employing the IR transmission towards the labels (without any problem of electromagnetic interferences) and the RF transmission towards the nodes (without any problem of consumption and directionality). Furthermore, also the replacement of the RF receiver of the labels with an IR receiving photodiode allows to reduce cost, bulkiness and consumption of the labels. At the same time, the problems of the antennae for the RF transmission from the nodes are avoided as well as possible electromagnetic interference problems in said transmissions, which are much longer and more complicated than the replies from the labels to the nodes.

On the other hand, the interactive capacities of the labels give advantages relating to the possibility of processing global or selected samples statistics on the interest of the customers in the exhibited goods.

Furthermore, there is the apparent advantage of having a real-time check of the amounts of goods present on the shelves. This check prevents that a product is sold out on the shelf, and therefore it is not sold any more until the shelf is replenished, while stocks thereof are available in the warehouse.

BRIEF DESCRIPTION OF THE DRAWINGS

These and other advantages and characteristics of the device according to the present invention will be apparent to those skilled in the art from the following detailed description of a preferred embodiment thereof referring to the annexed drawings wherein.

DESCRIPTION OF THE PREFERRED EMBODIMENTS

Figure 1:
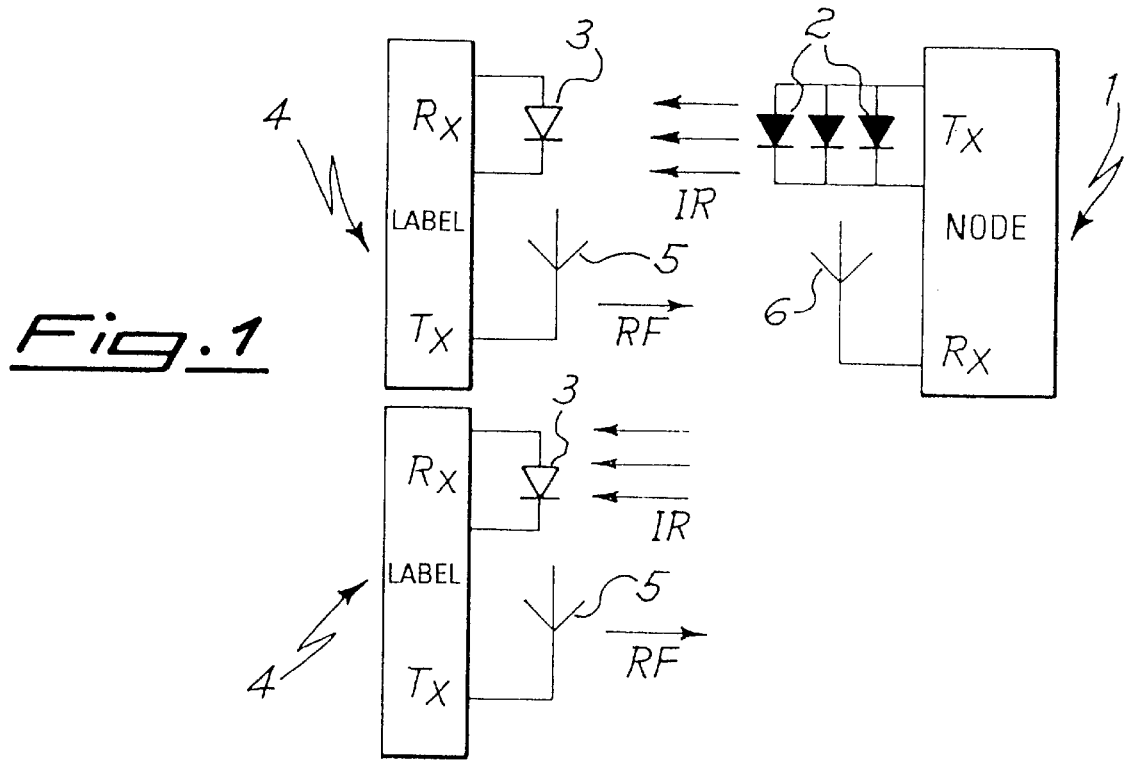
FIG. 1 is a schematic view showing a node in connection with two labels.

The method of communication of the device according to the present invention is shown in FIG. 1, wherein a node 1 transmits an IR signal by means of a plurality of transmitters 2. This IR transmission is received by the receiving photodiodes 3 of labels 4, which reply, in the absence of reception errors, with an RF signal emitted by transmitters 5. This signal is received by receiver 6 of node 1, which thus has the acknowledgement of the transmission success.

Figure 2:
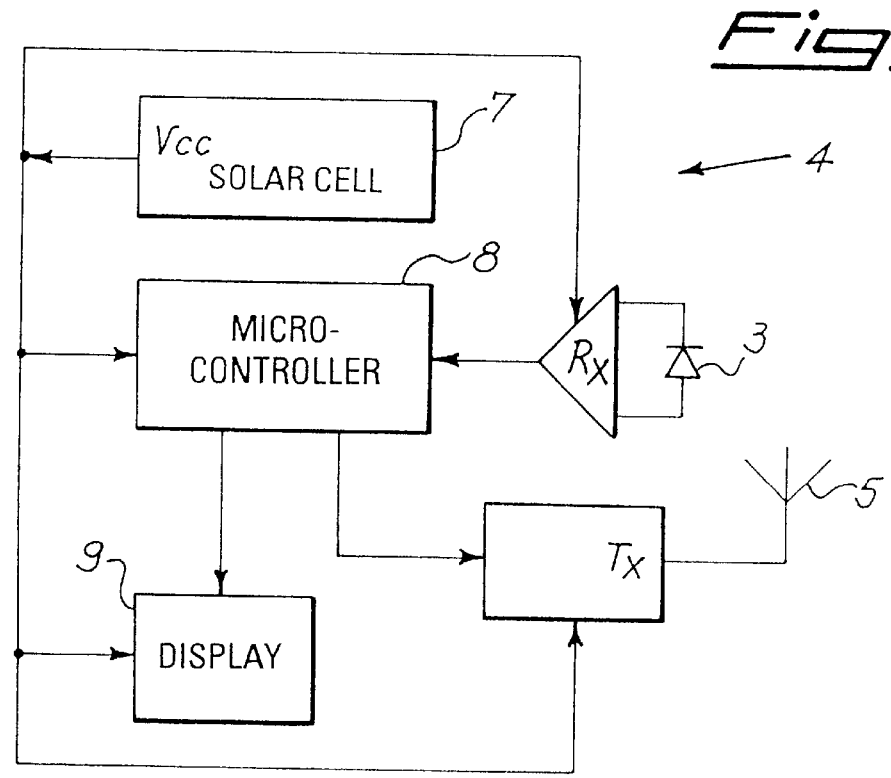
FIG. 2 is a schematic view showing the essential elements making up a label.

Referring to FIG. 2, there is seen that a label 4 of the present device includes, in addition to the IR receiver 3 and the RF transmitter 5, a solar cell 7, a microcontroller 8 and a display 9 of the LCD type. The solar cell 7 feeds all the label components, preferably with a supply voltage of 5 V. This voltage is regulated and kept constant by a DC/DC converter (not shown) coupled to solar cell 7 so that the change of the light conditions, and therefore of the voltage supplied by cell 7, does not jeopardize the correct operating of label 4. An example of such a type of converter is model MAX 756 by Maxim Integrated Products, which from an input voltage between 1.1 and 5.5 V is capable of steadily providing an output voltage of 3.3 or 5 V with an efficiency higher than 80% for currents up to 200 mA. In confirmation of the fact that a label 4 making part of the present device is capable of operating with the feed of solar cell 7 alone, the technical data concerning components available on the market are cited hereunder, merely for exemplificative purposes.

There is considered to employ a Panasonic Sun Ceram II solar cell model BP-24661 8S (size 24×66 mm) which supplies 32.5 mA at 1.8 V, in normal light conditions, for a power of 58.5 mW. By converting said voltage of 1.8 V into a 5 V voltage (with an 80% efficiency) 46.8 mW remain, i.e. 9.36 mA at 5 V. This current is largely sufficient even for the peak consumption corresponding to the emission of the reply signal, as it will result from the sum of the consumptions of the various components listed hereafter (all operating at 5 V). It should be noted, by the way, that the solar cell 7 may be divided into two or more smaller cells connected together, provided that the overall surface is maintained.

As microcontroller 8, i.e. the component controlling all the functions of label 4, there is considered model E25 by SGS-Thomson Electronics which, at an oscillation frequency of 1.2 MHz, in "standby" condition consumes just 0.01 mA, while in operation requires 0.6 mA. The LCD-type display 9 taken into consideration is model M1632 by Seiko which has a constant consumption of 2 mA.

As far as the connection to the node is concerned, the considered IR receiver 3 is model TFMS 5400 by Temic which has a constant consumption of 0.5 mA in "standby" condition, while at the moment it receives the transmission it has a peak consumption of 1 mA. For the transmission of the RF reply there is considered a model TX 433 SAW transmitter by Aurel which has a consumption of 3.5 mA during the transmission, whereas it has obviously no consumption while it is off.

When putting together the consumption of all the above-listed components, it results that the label in "standby" condition consumes just 2.51 mA, namely 0.01 mA of microcontroller 8, plus 2 mA of display 9, plus 0.5 mA of receiver 3. At the moment of the arrival of the IR transmission from the node, the consumption rises to 3.6 mA due to the activation of receiver 3 (+0.5 mA) and microcontroller 8 (+0.59 mA) which decodes the incoming signals. At the end of the reception, when the RF reply is transmitted to the node, the peak consumption reaches 6.6 mA due to the activation of transmitter 5 (+3.5 mA) and the reduction of the consumption of receiver 3 (−0.5 mA). Therefore it is clear that the current of 9.36 mA supplied by the solar cell is always largely sufficient for the label running in any operative condition. In order to obtain a further reduction of the peak consumption it is also possible to switch off display 9 during the transmission, thus reducing the peak to 4.6 mA only.

Figure 3:
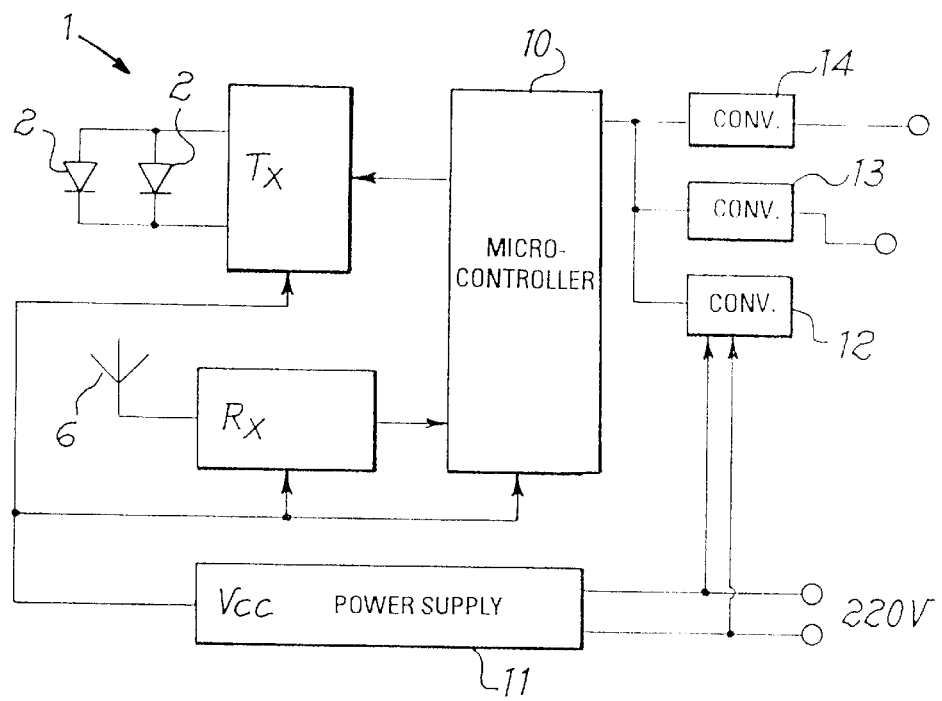
FIG. 3 is a schematic view showing the essential elements making up a node.

With reference to FIG. 3, there is seen that also a node making part of the communication network of the present device includes a microcontroller 10. The latter controls the node operations by controlling the IR transmitters 2 for the connection with the labels, from which it receives the replies by means of the RF receiver 6. The node components are fed through a power supply 11 connected to the electric network, preferably to the lighting as mentioned above.

The node can be connected to the communication network, and therefore to the central unit (not shown), through the same electric network by means of a guided wave converter 12. Alternatively, the connection can be made through an optical fiber network by means of a proper converter 13, or through a dedicated serial transmission network by means of a converter 14 of the RS 485 type. It is obvious that even if the three above-cited types of node connection have been illustrated together in FIG. 3 yet they are mutually exclusive, so that the device according to the invention actually includes only one type of communication network.

Figure 4:
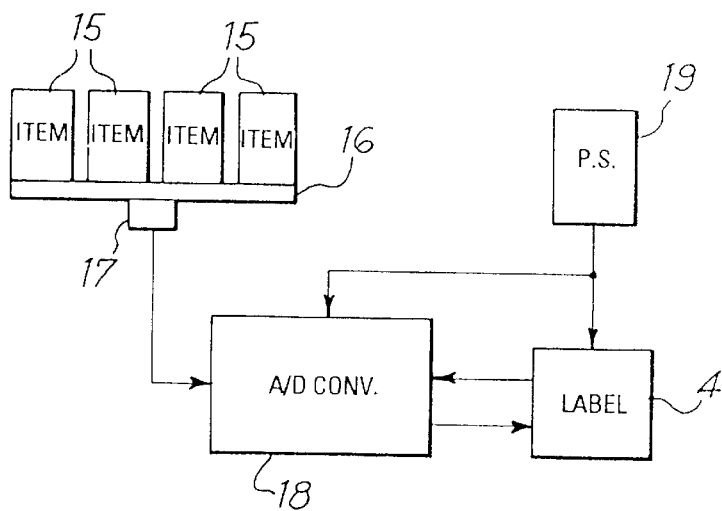
FIG. 4 is a schematic view showing the elements coupled to the label for checking the amounts of goods on the shelves.
Figure 5:
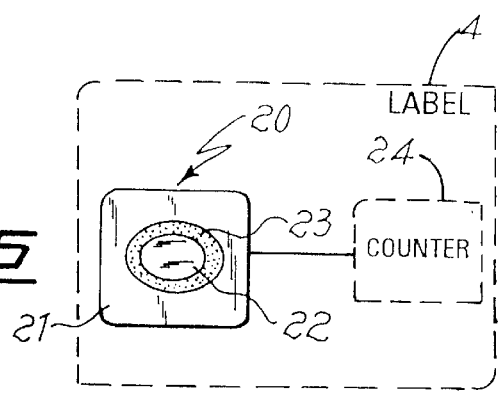
FIG. 5 is a schematic view showing a button located on the label for the interaction of the latter with the customers.

Referring to FIGS. 4 and 5, the further elements added to the device for a better exploitation of the communication network formed among the labels and the central unit through the nodes are now illustrated.

The elements allowing the monitoring of the amounts of goods 15 exhibited on the planes 16 of the shelves. Said planes 16 are of the mobile type and under each of them there is placed a load cell of weight measurement device 17 which detects the weight resting on the overlying plane or shelf 16. The weight is detected by cell 17 in the form of an analog signal which is converted into a digital signal by an analog-to-digital converter 18 before being passed on to label 4 upon request of the latter. In this way, the central unit can check the stocks of goods on the shelves by sending a specific request to each label 4, which questions converter 18 and transmits the datum of the detected weight to the central unit. The latter obtains the number of packages of the product on the basis of the weight of a single package which is present in its memory. A similar inventory control system is disclosed in WO 91/05227, which system however requires under each supporting surface a specific sensor in addition to the load cell. Clearly, such an inventory system is much more complicated and expensive, and can only be applied to goods whose type and/or nature can be detected by a sensor. In fact, the described system is applied to a bar for controlling the amount of drinks in the bottles by detecting their color.

It is to be noted that the operation of load cell 17 and converter 18 requires the presence of a dedicated supply power 19 which may also advantageously feed label 4, which however is not different from the labels placed on shelves not provided with the monitoring of the goods stocks.

Finally referring to FIG. 5, there is shown a button 20 located on label 4 to provide statistical indications on the actual interest of the customers in each product. In the previously-cited application WO 92/08213 there is disclosed a label provided with a button for changing the information shown on the display, so as to be able to give more information even on a small-size display. However, this type of interaction with the customers is completely "passive", in that it is merely intended to provide the customer with more information.

In the device according to the present invention, the button 20 located on label 4 similarly allows to change the information shown on the display, but at the same time it activates a counter 24 inside the label which thus permits to know how many persons have been sufficiently interested in the product to the point of asking the displaying of further information about it. This datum is then transmitted to the central unit upon request of the latter, as in the stocks monitoring function illustrated above.

Since anybody can push button 20 and thus enter the data base on which the interest statistics will be processed, it is useful to be also able to select, if desired, a particular sample of customers whose interests are to be known. To this purpose, button 20 is provided with a means for activating the counter 24 inside the label which can be operated only by those which make part of said selected sample.

An example of such a selective means consists in a Hall-effect sensor or a reed sensor which is sensitive to magnetic fields. By giving a magnetic gadget to the selected customers which are requested to position it near button 20 in order to obtain further information on the products they are interested in, it is thus possible to obtain a statistic concerning the selected sample of customers at a very low cost. The button 20 illustrated in FIG. 5 is made as a touch-key provided with a metallic peripheral surface 21 (preferably copper) in the center of which there is placed a Hall-effect sensor 22 isolated therefrom by means of an isolating layer 23. The replacement of the Hall-effect sensor with a reed sensor provides the further advantage of a little energy saving since the latter does not consume current when it is not working.

Clearly, the above-described and illustrated embodiment is disclosed as a mere example, since it susceptible of changes, for example, to the shape and arrangement of solar cell 7, or to the type of selective sensor 22.

I claim:

1. An electronic system for removing displaying of information in a retail environment, the system comprising:

a central control unit;

a communications network having a plurality of nodes, each node being coupled to the central control unit; and a plurality of electronic labels, each label having a display for showing information relating to an exhibited item adjacent the label, the items being retail goods available for purchase by a customer;

each node having at least one transmitter for sending a signal to at least one of the labels, the at least one transmitter being of an infrared (IR) type only;

each label having a receiver for receiving a signal from at least one of the nodes, the receiver being of an infrared (IR) type only;

each label having a transmitter for sending a message to at least one of the nodes, the transmitter being of a radio frequency (RF) type only; and each node having a receiver for receiving a message from at least one of the labels, the receiver being of a radio frequency (RF) type only, wherein the mixed IR/RF communication scheme eliminates node transmitter antenna concerns, reduces signal interference and reduces label receiver power consumption compared to an RF communication scheme used between the nodes and the labels, while simultaneously reducing label transmitter power consumption, reducing component requirements and reducing the number of nodes required by the system compared to an IR communication scheme used between the labels and the nodes.

2. The system of claim 1 wherein each label further has a power source comprising at least one photovoltaic cell, such cell being the sole power source for the label.

3. The system of claim 2 wherein each label further has an actuation button for changing the information shown on the display, and a counter coupled to the button, the counter for counting each actuation of the button.

4. The system of claim 1 wherein the exhibited item comprises a number of units of a commodity, the system further including a shelf for supporting the number of units of the commodity, and a weight measurement device coupled to the shelf, the weight measurement device for determining a weight of the number of units of the commodity on the shelf, and for providing a signal corresponding to the determined weight to a corresponding label.

5. The system of claim 2 wherein the exhibited item comprises a number of units of a commodity, the system further including a shelf for supporting the number of units of the commodity, and a weight measurement device coupled to the shelf, the weight measurement device for determining a weight of the number of units of the commodity on the shelf, and for providing a signal corresponding to the determined weight to a corresponding label.

6. The system of claim 1 wherein each label further has an actuation button for changing the information shown on the display, and a counter coupled to the button, the counter for counting each actuation of the button.

7. The system of claim 6 wherein the exhibited item comprises a number of units of a commodity, the system further including a shelf for supporting the number of units of the commodity, and a weight measurement device coupled to the shelf, the weight measurement device for determining a weight of the number of units of the commodity on the shelf, and for providing a signal corresponding to the determined weight to a corresponding label.

8. The system of claim 6 wherein each label further has a sensor for sensing a pre-determined item, the sensor being coupled to the counter, the sensor for allowing the counter to count only when the sensor senses the pre-determined item.

9. The system of claim 8 wherein the sensor is a magnetic sensor for sensing a magnet.

10. The system of claim 9 wherein the exhibited item comprises a number of units of a commodity, the system further including a shelf for supporting the number of units of the commodity, and a weight measurement device coupled to the shelf, the weight measurement device for determining a weight of the number of units of the commodity on the shelf, and for providing a signal corresponding to the determined weight to a corresponding label.

11. The system of claim 1 wherein the exhibited item comprises a number of units of a commodity, the system further including a shelf for supporting the number of units of the commodity, and a weight measurement device coupled to the shelf, the weight measurement device for determining a weight of the number of units of the commodity on the shelf, and for providing a signal corresponding to the determined weight to a corresponding label.

* * * * *